United States Patent
Lee et al.

(10) Patent No.: US 9,158,560 B2
(45) Date of Patent: Oct. 13, 2015

(54) DYNAMIC APPLICATION ARRANGER

(71) Applicants: VERIZON NEW JERSEY INC., Newark, NJ (US); VERIZON PATENT AND LICENSING, INC., Basking Ridge, NJ (US)

(72) Inventors: Woo Beum Lee, Basking Ridge, NJ (US); Michelle Felt, Randolph, NJ (US)

(73) Assignees: Verizon Patent and Licensing Inc., Basking Ridge, NJ (US); Verizon New Jersey Inc., Newark, NJ (US)

( * ) Notice: Subject to any disclaimer, the term of this patent is extended or adjusted under 35 U.S.C. 154(b) by 257 days.

(21) Appl. No.: 13/661,641

(22) Filed: Oct. 26, 2012

(65) Prior Publication Data

US 2014/0123022 A1  May 1, 2014

(51) Int. Cl.
   *G06F 9/44* (2006.01)
   *G06F 3/0481* (2013.01)
   *G06F 9/445* (2006.01)

(52) U.S. Cl.
   CPC .......... *G06F 9/44505* (2013.01); *G06F 9/4443* (2013.01)

(58) Field of Classification Search
   USPC ................................................. 715/700–866
   See application file for complete search history.

(56) References Cited

U.S. PATENT DOCUMENTS

| | | | |
|---|---|---|---|
| 8,595,186 B1 * | 11/2013 | Mandyam et al. | 707/632 |
| 2007/0082707 A1 * | 4/2007 | Flynt et al. | 455/564 |
| 2010/0023874 A1 * | 1/2010 | Frohwein | 715/747 |
| 2010/0255882 A1 * | 10/2010 | Kozitsyn et al. | 455/566 |
| 2011/0010673 A1 * | 1/2011 | Takeda | 715/847 |
| 2012/0120105 A1 * | 5/2012 | Honda | 345/634 |
| 2013/0055160 A1 * | 2/2013 | Yamada et al. | 715/810 |
| 2013/0080972 A1 * | 3/2013 | Moshrefi et al. | 715/808 |
| 2013/0103665 A1 * | 4/2013 | Kasterstein et al. | 707/706 |
| 2013/0159234 A1 * | 6/2013 | Xing et al. | 706/46 |
| 2013/0232256 A1 * | 9/2013 | Lee et al. | 709/224 |
| 2013/0311883 A1 * | 11/2013 | McCoy et al. | 715/703 |
| 2014/0075328 A1 * | 3/2014 | Hansen et al. | 715/747 |
| 2015/0020191 A1 * | 1/2015 | Vida et al. | 726/17 |

FOREIGN PATENT DOCUMENTS

JP          11136323 A   *   5/1999

OTHER PUBLICATIONS

"Chameleon: A Better Home Screen for your Android Tablet". Kickstarter [online], [retrieved on Mar. 18, 2015]. Retrieved from the Internet (URL: https://web.archive.org/web/20120616080252/http://www.kickstarter.com/projects/gaborvida/chameleon-a-better-home-screen-for-your-android-ta-0), Jun. 16, 2012.*

Sage, Simon. "Chameleon launcher review". Android Central [online], [retrieved on Mar. 18, 2015]. Retrieved from the Internet (URL: http://www.androidcentral.com/chameleon-launcher-review), Sep. 24, 2012.*

* cited by examiner

*Primary Examiner* — Andrea Leggett
*Assistant Examiner* — Daniel Samwel

(57) ABSTRACT

A device may determine an application shortcut and a set of specified conditions, where the application shortcut is to be presented on a home screen of a user device when the set of specified conditions is satisfied. The device may determine a set of current conditions associated with the user device, and may present the application shortcut on the home screen of the user device based on the set of current conditions satisfying the set of specified conditions.

20 Claims, 9 Drawing Sheets

DYNAMIC APPLICATION ARRANGER

BACKGROUND

Users of mobile devices, such as smart phones, often have a large number of applications stored on the mobile devices. An application, also known as application software, is computer software designed to help users perform specific tasks. For example, an application may display weather conditions, may deliver news stories, may provide sports scores, may provide restaurant reviews, etc.

DETAILED DESCRIPTION OF PREFERRED EMBODIMENTS

The following detailed description of example implementations refers to the accompanying drawings. The same reference numbers in different drawings may identify the same or similar elements.

Users of mobile devices, such as smart phones, often have a large number of applications stored on the mobile devices. Because of the large number of stored applications, users may have difficulty locating a particular application. For example, a user may have to navigate through various screens to locate the particular application. Implementations described herein may help users to easily locate applications by arranging application shortcuts on a home screen of a user device based on one or more conditions detected by the user device.

As used herein, an "application shortcut" or a "shortcut" may refer to an item, presented on a display of a user device, which may be used to launch or activate an application when a user interacts with the item (e.g., by selecting the shortcut, by clicking on the shortcut, by tapping the shortcut on a touch screen, etc.). For example, the application shortcut may include an icon, an image, text, a hyperlink, etc.

Figure 1:
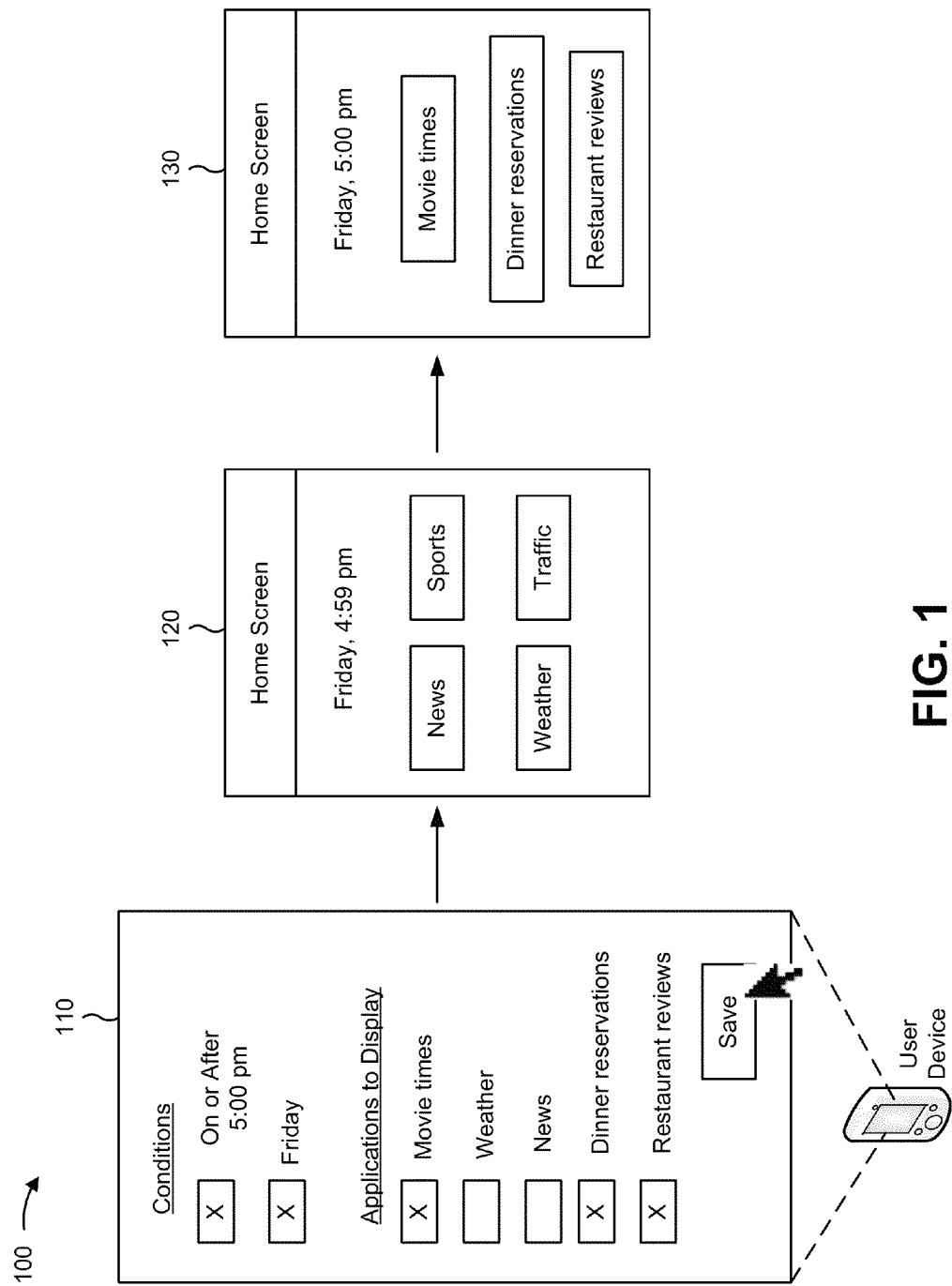
FIG. 1 is a diagram of an overview of an example implementation described herein.

FIG. 1 is a diagram of an overview of an example implementation 100 described herein. As shown in FIG. 1, example implementation 100 may include a user device, such as a smart phone. The user device may present user interfaces for display, such as user interfaces 110, 120, and 130, and a user may interact with the user interfaces to provide input to the user device.

For example, a user may interact with user interface 110 to select application shortcuts to be presented (e.g., displayed) on a home screen of the user device when particular conditions are met. The user may also input the conditions that, when met, cause the selected application shortcuts to be presented on the home screen. As used herein, a "home screen" may refer to a first screen of information that is presented when a user device is started (e.g., when the user device is powered on and/or finishes booting, when a display screen of the user device is turned on, etc.).

In example implementation 100, assume that the user has selected three applications for which shortcuts are to be presented on the home screen of the user device: a movie time application, a dinner reservation application, and a restaurant review application. Further assume that the user has selected two conditions that determine when shortcuts to the selected applications will be presented on the home screen: on or after 5:00 pm and on a Friday.

As shown on user interface 120, the home screen of the user device may present shortcuts to a news application, a sports application, a weather application, and a traffic application before 5:00 pm on a Friday. As shown on user interface 130, when the user device detects that it is 5:00 pm or later on a Friday, the user device may change the application shortcuts presented on the home screen to the application shortcuts selected by the user. As shown, the user device may present shortcuts to the movie time application, the dinner reservation application, and the restaurant review application after 5:00 pm on a Friday.

In some implementations, the user device may determine application shortcuts to present on the home screen based on detected user behavior. For example, a user may frequently launch an email application on weekday mornings. In response to this user behavior, the user device may place a shortcut to the email application on the home screen during weekday mornings.

Figure 2:
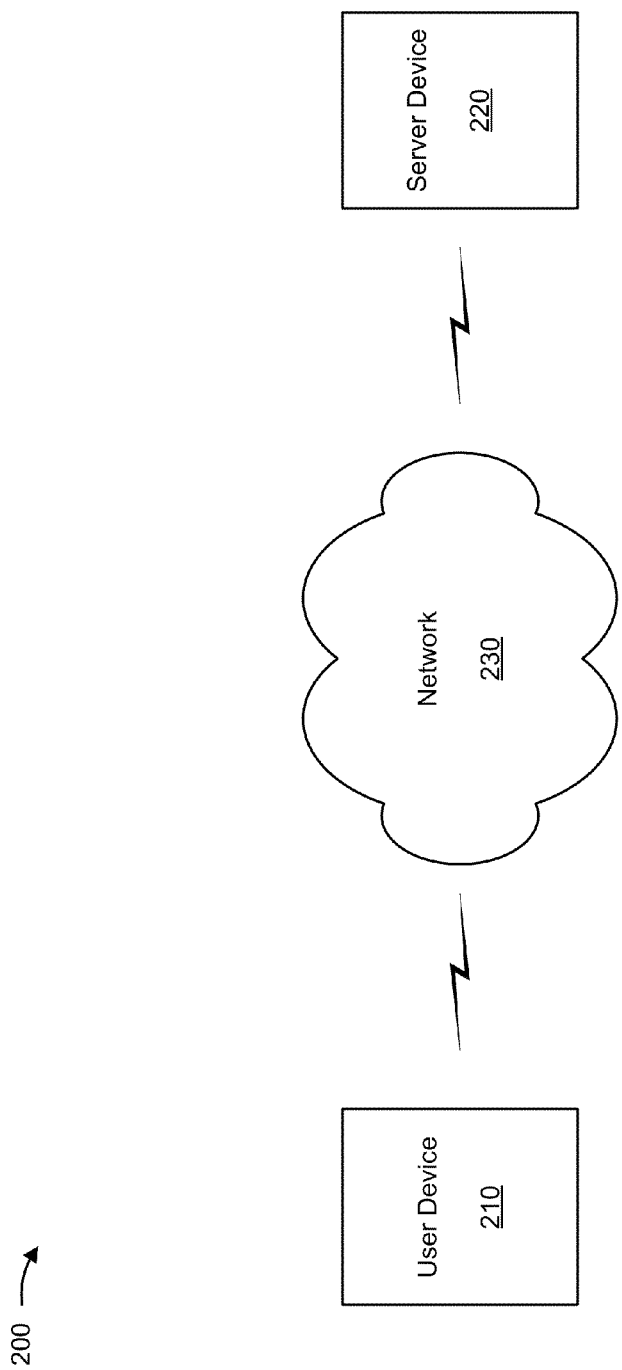
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230.

User device 210 may include a device capable of providing, presenting, and/or displaying application shortcuts that launch software applications. For example, user device 210 may include a mobile phone (e.g., a smart phone, a radiotelephone, etc.), a computing device (e.g., a desktop computer, a laptop computer, a tablet computer, a handheld computer, etc.), or a similar device. In some implementations, user device 210 may include a touch screen display that allows a user to provide input to user device 210. Additionally, or alternatively, user device 210 may include a communication interface that allows user device 210 to receive information from and/or transmit information to server device 220.

Server device 220 may include one or more server devices, or other types of devices, that gather, process, search, store, and/or provide information in a manner described herein. In some implementations, user device 210 may download applications from server device 220. Additionally, or alternatively, server device 220 may provide information associated with applications (e.g., user behavior with respect to launching and/or downloading applications, conditions under which the applications are launched and/or downloaded, etc.) to user device 210.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
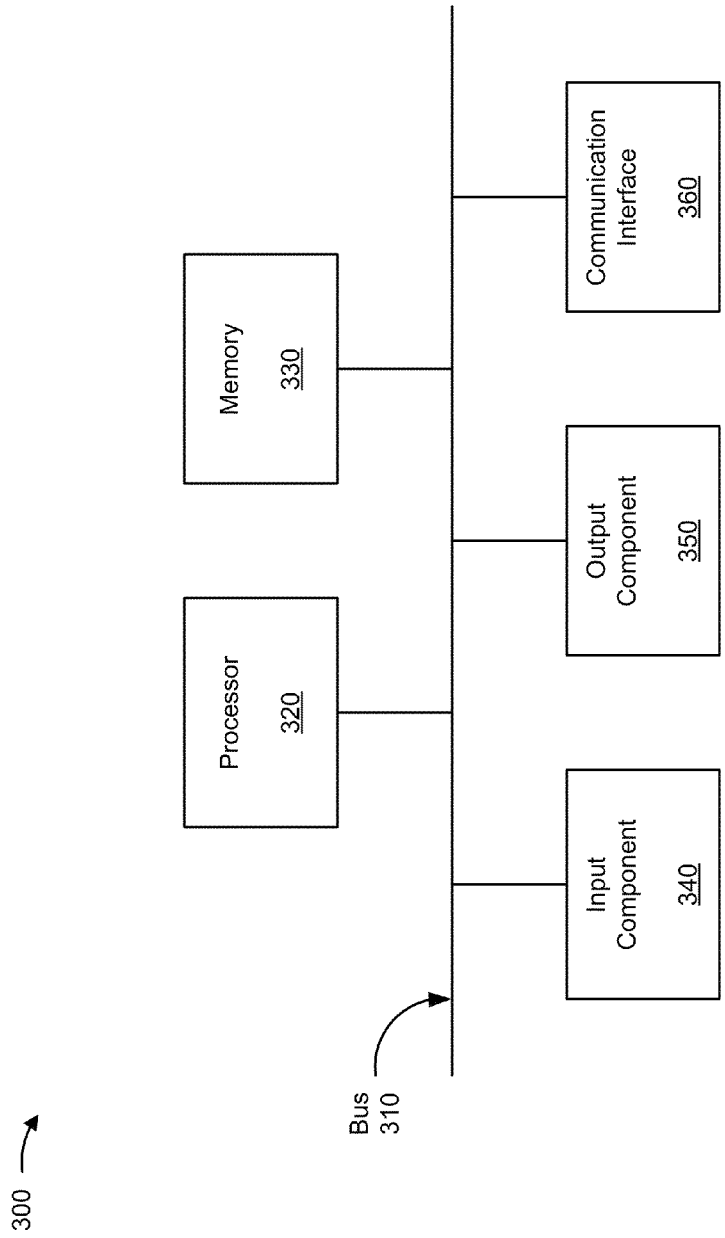
FIG. 3 is a diagram of example components of one or more devices of FIG. 2.

FIG. 3 is a diagram of example components of a device 300. Device 300 may correspond to user device 210 and/or server device 220. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210 and/or server device 220 may include one or more devices 300 and/or one or more components of device 300.

Figure 4:
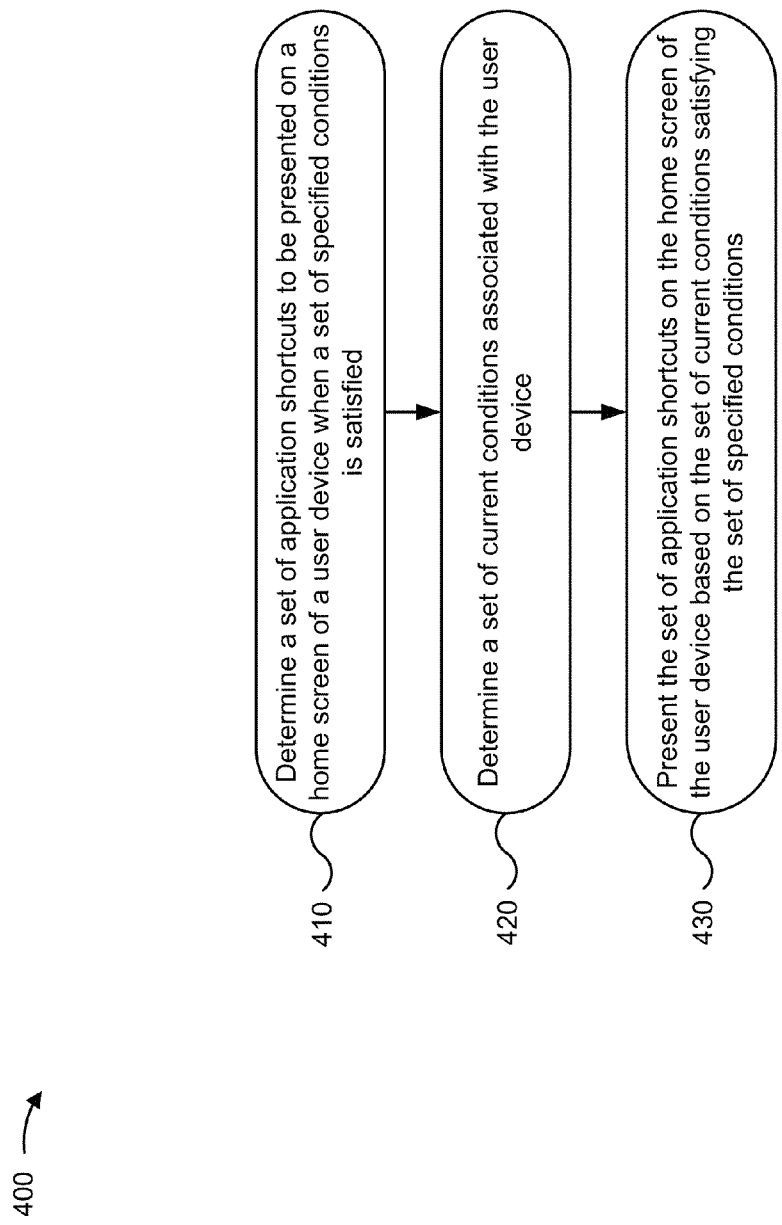
FIG. 4 is a flow chart of an example process for presenting application shortcuts on a home screen of a user device based on conditions detected by the user device.

FIG. 4 is a flow chart of an example process 400 for presenting application shortcuts on a home screen of a user device based on conditions detected by the user device. In some implementations, one or more process blocks of FIG. 4 may be performed by user device 210. Additionally, or alternatively, one or more process blocks of FIG. 4 may be performed by another device or a group of devices separate from or including user device 210, such as server device 220.

As shown in FIG. 4, process 400 may include determining a set of application shortcuts to be presented on a home screen of a user device when a set of specified conditions is satisfied (block 410). In some implementations, user device 210 may determine the shortcuts and/or the specified conditions based on user input. Additionally, or alternatively, user device 210 may classify applications in a category (e.g., based on the type of application, such as a traffic application, a news application, a weather application, etc.). User device 210 may receive a category for an application from a user and/or from another device, such as server device 220. In some implementations, the user may specify a category of applications to display when the set of specified conditions is satisfied, and the set of application shortcuts may include shortcuts to applications classified in the category.

Additionally, or alternatively, user device 210 may determine the shortcuts and/or the specified conditions based on user behavior detected by user device 210. For example, when a user launches an application, user device 210 may store information that identifies the application (or a category of the application), as well as conditions associated with a time the application is launched (e.g., day of week, time, etc.). User device 210 may keep track of a quantity of times that one or more conditions are met when the application is launched. When the quantity of times satisfies a threshold, user device 210 may present the application shortcut on the home screen when the one or more conditions are met. Additionally, or alternatively, user device 210 may prompt the user and may receive user input to present the application on the home screen when the one or more conditions are met. Additionally, or alternatively, user device 210 may keep track of conditions when a user rearranges application shortcuts (e.g., places a shortcut on the home screen, removes a shortcut from the home screen, etc.).

Additionally, or alternatively, user device 210 may determine the shortcuts and/or the specified conditions based on information received from another device. For example, server device 220 may aggregate information that identifies applications used by multiple users, and that identifies conditions associated with times the applications are launched by the multiple users. Server device 220 may transmit information, to user device 210, that identifies shortcuts and/or specified conditions based on the aggregated information. For example, when a quantity of users, that launch a particular application under particular conditions, satisfies a threshold, user device 210 may prompt the user and may receive user input to present the particular application on the home screen when the particular conditions are met.

The conditions may include any condition detectable by user device 210. For example, the condition may be based on time, such as a time of day (e.g., before or after a particular time, within a particular time range, etc.), a date (e.g., a month, day, and/or year; a holiday; a user's birthday; etc.), a day of the week (e.g., Monday, Tuesday, etc., a weekday, a weekend), a particular week or set of weeks, a particular month or set of months, a particular season (e.g., spring, summer, fall, winter), a particular year, etc.

The conditions may also be based on a speed or velocity at which user device 210 is moving, an acceleration of user device 210, a geographic location of user device 210 (e.g., determined based on a time zone, global positioning system (GPS) coordinates, cellular base station triangulation, etc.), a change in geographic location of user device 210 (e.g., a change of location in a particular time period, indicating that the user is traveling, such as at a particular speed), a landmark, attraction, merchant, etc. associated with a geographic location of user device 210 (e.g., a golf course, a national park, a restaurant, a coffee shop, etc.), a temperature detected by user device 210, an altitude detected by user device 210, etc.

The conditions may also be based on a network connectivity of user device 210, such as whether user device 210 is connected to a particular type of network, such as a radio access network (RAN), a local area network (LAN)/personal area network (PAN) (e.g., a Bluetooth network, a WiFi network, an ultra-wideband network, etc.), whether user device 210 is connected to a particular network, such as a network identifiable by particular access credentials, such as a username and passkey (e.g., a user's home network, a Bluetooth network in a user's car, a network at a particular merchant location, a network connection to another user device 210, etc.), etc. In some implementations, the conditions may be based on whether user device 210 is on a phone call.

As further shown in FIG. 4, process 400 may include determining a set of current conditions associated with the user device (block 420). In some implementations, user device 210 may determine current conditions, which may include any of the conditions discussed above. User device 210 may determine the current conditions based on receiving a request to provide, present, and/or display the home screen. For example, user device 210 may determine the current conditions when a user powers up and/or turns on user device 210 and/or a display (e.g. a screen) of user device 210. Additionally, or alternatively, user device 210 may determine the current conditions when the user switches to the home screen from a screen other than the home screen (e.g., by swiping a touch screen, scrolling, etc.). Additionally, or alternatively, user device 210 may periodically determine the current conditions (e.g., once per hour, once per minute, etc.).

As further shown in FIG. 4, process 400 may include presenting the set of application shortcuts on the home screen of the user device based on the set of current conditions satisfying the set of specified conditions (block 430). For example, user device 210 may receive and/or detect the current conditions, and may compare the current conditions to the specified conditions. When the current conditions satisfy the specified conditions, user device 210 may present the specified set of application shortcuts on the home screen of user device 210. Additionally, or alternatively, user device 210 may recommend an application for a user to download to user device 210, based on the current conditions. For example, user device 210 may determine that many users launch a traffic application around 5:00 pm, and may recommend that the user download a traffic application to be presented on the home screen.

In some implementations, a current condition may satisfy a specified condition based on the current condition satisfying a yes/no (e.g., true/false) determination (e.g., is it before noon on a Saturday?). Additionally, or alternatively, a current condition may satisfy a specified condition based on the current condition satisfying a threshold (e.g., is user device 210 traveling faster than a threshold speed?). In some implementations, user device 210 may present a shortcut on the home screen based on a single current condition satisfying a single specified condition. Alternatively, user device 210 may present one or more shortcuts on the home screen based on one or more current conditions satisfying one or more specified conditions.

As an example, assume that a user is traveling in a car on a highway. User device 210 may detect the speed at which user device 210 is moving (e.g., above a threshold speed, determined using a change in GPS coordinates over time, an accelerometer, etc.), a change in location of user device 210, a path of user device 210 along a road or highway (e.g., as indicated by a GPS position of user device 210), a Bluetooth connection between user device 210 and the user's car, or another condition that indicates that the user is traveling. Based on the indication that the user is traveling, user device 210 may present, on the home screen of user device 210, a navigation application, a traffic application, a travel application (e.g., that provides information regarding points of interest along the user's route), a Bluetooth application, a hands-free application, etc. In some implementations, user device 210 may determine a direction of travel (e.g., south on I-495 toward Washington, D.C.), and may present, on the home screen, an application related to a city toward which user device 210 is traveling (e.g., a points of interest application).

In some implementations, user device 210 may detect that user device 210 is located in a train station, a subway station, an airport, etc., and may present, on the home screen, an application that displays a subway or airport map, a train or flight schedule, etc. Additionally, user device 210 may detect that user device 210 is located at a particular point of interest, such as a golf course, a national park, a national monument, a hotel, etc., and may present, on the home screen, an application that displays information associated with the point of interest (e.g., a map of a golf course with a par for each hole, hours of operation for the point of interest, historical information about the point of interest, etc.).

As another example, assume that the user is out in a city (e.g., New York) on a Saturday night. User device 210 may detect the time of day (e.g., night or evening time, after 7:00 pm, etc.), a day of the week (e.g., Saturday), a location of the user (e.g., outside of the user's home, at a location in the city, etc.), etc. Based on the detected conditions, user device 210 may present, on the home screen, a social media application, a text messaging application, a movie time application, a camera application, a restaurant application, a business search application, etc. In some implementations, user device 210 may present an alarm application on the home screen when it detects that a user has returned home (e.g., based on a location) and/or after a particular time (e.g., after 10:00 pm).

As yet another example, user device 210 may determine a location of user device 210 based on a network connectivity of user device 210. For example, user device 210 may determine that the user is at home based on a Wi-Fi network connection between user device 210 and the user's home router (e.g., determined based on a network name and/or security credentials used to access the network). User device 210 may present different applications on the home screen based on the location of the user (e.g., at home, at work, at a store or merchant location, at a coffee shop, at an airport, in a car, a hotel, etc.). For example, when user device 210 is located in a hotel, user device 210 may present, on the home screen, an alarm application.

While a series of blocks has been described with regard to FIG. 4, the blocks and/or the order of the blocks may be modified in some implementations. Additionally, or alternatively, non-dependent blocks may be performed in parallel.

Figure 5:
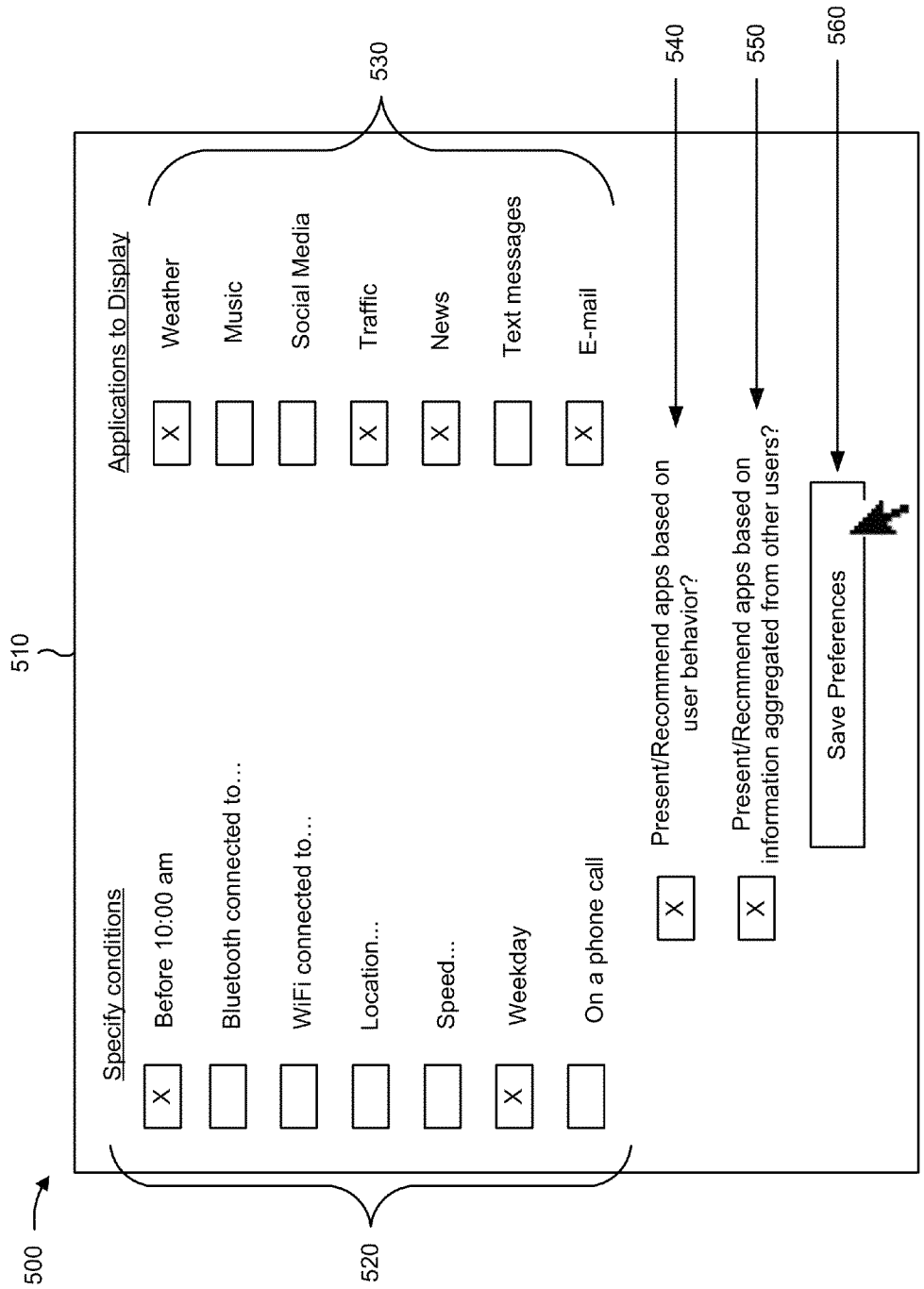
FIGS. 5-9 are diagrams of example implementations relating to the example process shown in FIG. 4.

FIG. 5 is a diagram of an example implementation 500 relating to process 400 shown in FIG. 4. FIG. 5 shows a user interface 510, which may be presented on a display of user device 210.

As shown by reference number 520, a user may interact with user interface 510 (e.g., via a checkbox, a list box, a button, etc.) to specify conditions under which an application shortcut is to be presented on the home screen of user device 210. As shown by reference number 530, a user may interact with user interface 510 (e.g., via a checkbox, a list box, etc.) to specify applications for which shortcuts are to be presented on the home screen when the specified conditions are met. For example, a user may specify that shortcuts to a weather application, a traffic application, a news application, and an e-mail application are to be presented on the home screen when the current conditions are before 10:00 am on a weekday.

As shown by reference number 540, a user may interact with user interface 510 (e.g., via a checkbox, a button, a menu item, etc.) to specify whether user device 210 is to present application shortcuts, or is to recommend application shortcuts to be presented on the home screen, based on user behavior. When the user indicates that user device 210 is to present or recommend shortcuts based on user behavior, user device 210 may keep track of the conditions that are in place when an application is launched. When the user launches the application a threshold quantity of times with the conditions in place, user device 210 may present a shortcut to the application on the home screen when the conditions are met, or may present a recommendation that the application shortcut be presented on the home screen when the conditions are met.

In some implementations, user device 210 may receive information that identifies one or more conditions to track (e.g., from a user, from server device 220, etc.). For example, a user may specify that user device 210 keep track of a time of day and a location of user device 210 each time an application is launched. After the user launches the application a threshold quantity of times at a particular time of day (e.g., before 9:00 am), user device 210 may present the application on the home screen at that particular time of day (e.g., before 9:00 am). Additionally, or alternatively, after the user launches the application a threshold quantity of times at a particular location (e.g., at work), user device 210 may present the application on the home screen when user device 210 is located at the particular location (e.g., at work).

In some implementations, multiple conditions may be required to meet a threshold quantity before user device presents the application on the home screen. For example, after a user launches the application a threshold quantity of times at a particular time (e.g., before 9:00 am) and at a particular location (e.g., at work), user device 210 may present the application on the home screen at the particular time and location. In some implementations, user device 210 may receive information that identifies the quantity of conditions required to be met (e.g., from a user and/or server device 220).

As shown by reference number 550, a user may interact with user interface 510 (e.g., via a checkbox, a button, etc.) to specify whether user device 210 is to present application shortcuts, or is to recommend application shortcuts to be presented on the home screen based on information aggregated from other users. When the user indicates that user device 210 is to present or recommend shortcuts based on aggregated information, user device 210 may aggregate information from other users (e.g., with the explicit permission of the users). The aggregated information may identify applications used by the other users and conditions under which the applications are launched by the other users.

When the other users launch an application a threshold quantity of times with the conditions in place, user device 210 may present a shortcut to the application on the home screen when the conditions are met, or may present a recommendation that the shortcut be presented on the home screen when the conditions are met. Additionally, or alternatively, when a quantity and/or a percentage of users, which have launched the application under the conditions, satisfies a threshold, user device 210 may present the shortcut on the home screen and/or may present a recommendation that the shortcut be presented on the home screen when the conditions are met. Additionally, or alternatively, when a threshold quantity and/or threshold percentage of users have launched the application, under the conditions, a threshold quantity of times, user device 210 may present the shortcut on the home screen and/or may present a recommendation that the shortcut be presented on the home screen when the conditions are met.

As shown by reference number 560, a user may interact with user interface 510 (e.g., via a button, a link, etc.) to save the specified conditions, applications, and settings indicated by reference numbers 520-550. User device 210 may operate based on and/or may store the specified conditions, applications, and settings.

Figure 6:
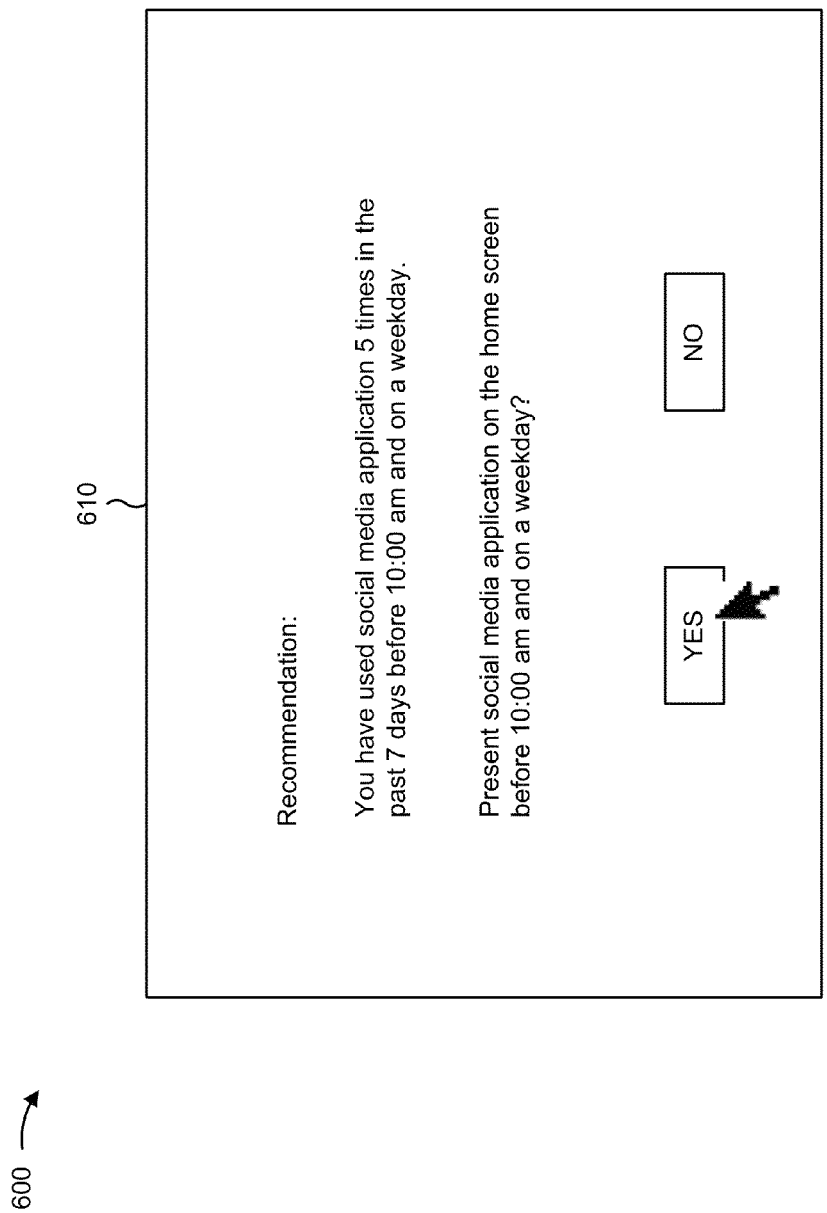

FIG. 6 is a diagram of an example implementation 600 relating to process 400 shown in FIG. 4. FIG. 6 shows a user interface 610, which may be presented on a display of user device 210.

As discussed above, user device 210 may keep track of user behavior, with explicit permission from the user. For example, user device 210 may store a set of conditions that are in place when a user launches an application. When the quantity of times that a user launches the application, with the conditions in place, satisfies a threshold, user device 210 may present a recommendation to the user, as shown by user interface 610. For example, user interface 610 may present a notification that the user has launched a social media application five times in the past seven days before 10:00 am on a weekday, and may recommend that the social media application be presented on the home screen before 10:00 am on a weekday, as illustrated.

In some implementations, the threshold may be based on a total quantity of times an application was launched, with the conditions in place. Additionally, or alternatively, the threshold may be based on a quantity of times that the application was launched, with the conditions in place, during a particular time period (e.g., the past week, within a one month period, etc.).

As shown on user interface 610, user device 210 may receive input from the user (e.g., via a button, a menu item, a link, etc.) that specifies whether user device 210 should present a shortcut to the application on the home screen when the conditions are met. For example, a user may provide input that indicates that user device 210 should present the social media application on the home screen before 10:00 am on a weekday, as illustrated.

Figure 7:
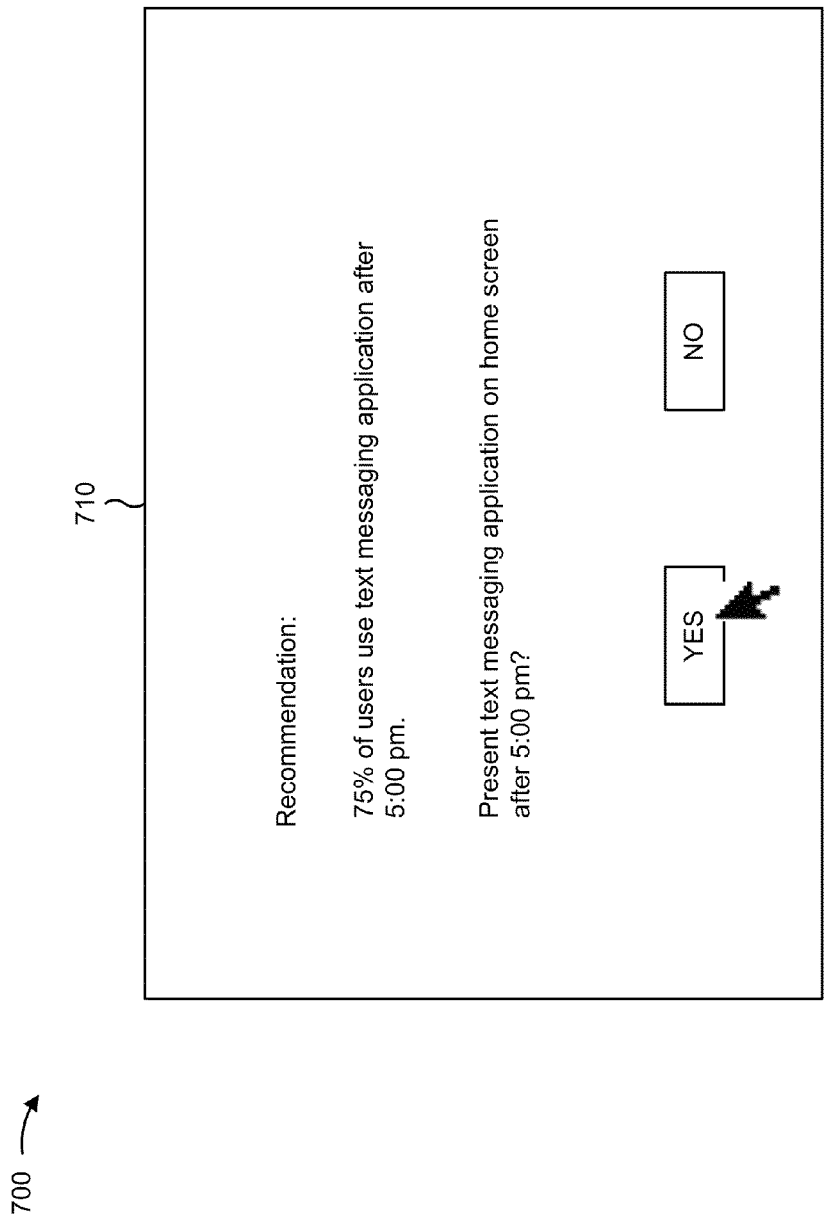

FIG. 7 is a diagram of an example implementation 700 relating to process 400 shown in FIG. 4. FIG. 7 shows a user interface 710, which may be presented on a display of user device 210.

As discussed above, user device 210 may receive aggregated information (e.g., from server device 220), and may make a recommendation, based on the aggregated information, of an application shortcut to be presented on the home screen. For example, user device 210 may receive an indication that a particular quantity and/or percentage of users launch an application when particular conditions are in place. When the particular quantity and/or percentage satisfies a threshold, user device 210 may present a recommendation to the user, as shown by user interface 710. For example, user interface 710 may present a notification that 75% of users launch a text messaging application after 5:00 pm and may recommend that the text messaging application be presented on the home screen after 5:00 pm on a weekday, as illustrated.

In some implementations, user device 210 may recommend an application for the user to download, based on the aggregated information. For example, user device 210 may receive an indication that 75% of users launch a social media application on the weekend. User device 210 may determine that user device 210 does not have a social media application installed, and may recommend that a user of user device 210 download a social media application.

As shown on user interface 710, user device 210 may receive input from the user (e.g., via a button, a menu item, a link, etc.) that specifies whether user device 210 should present a shortcut to the application on the home screen when the conditions are met. For example, a user may provide input that indicates that user device 210 should present the text messaging application on the home screen after 5:00 pm, as illustrated.

Figure 8:
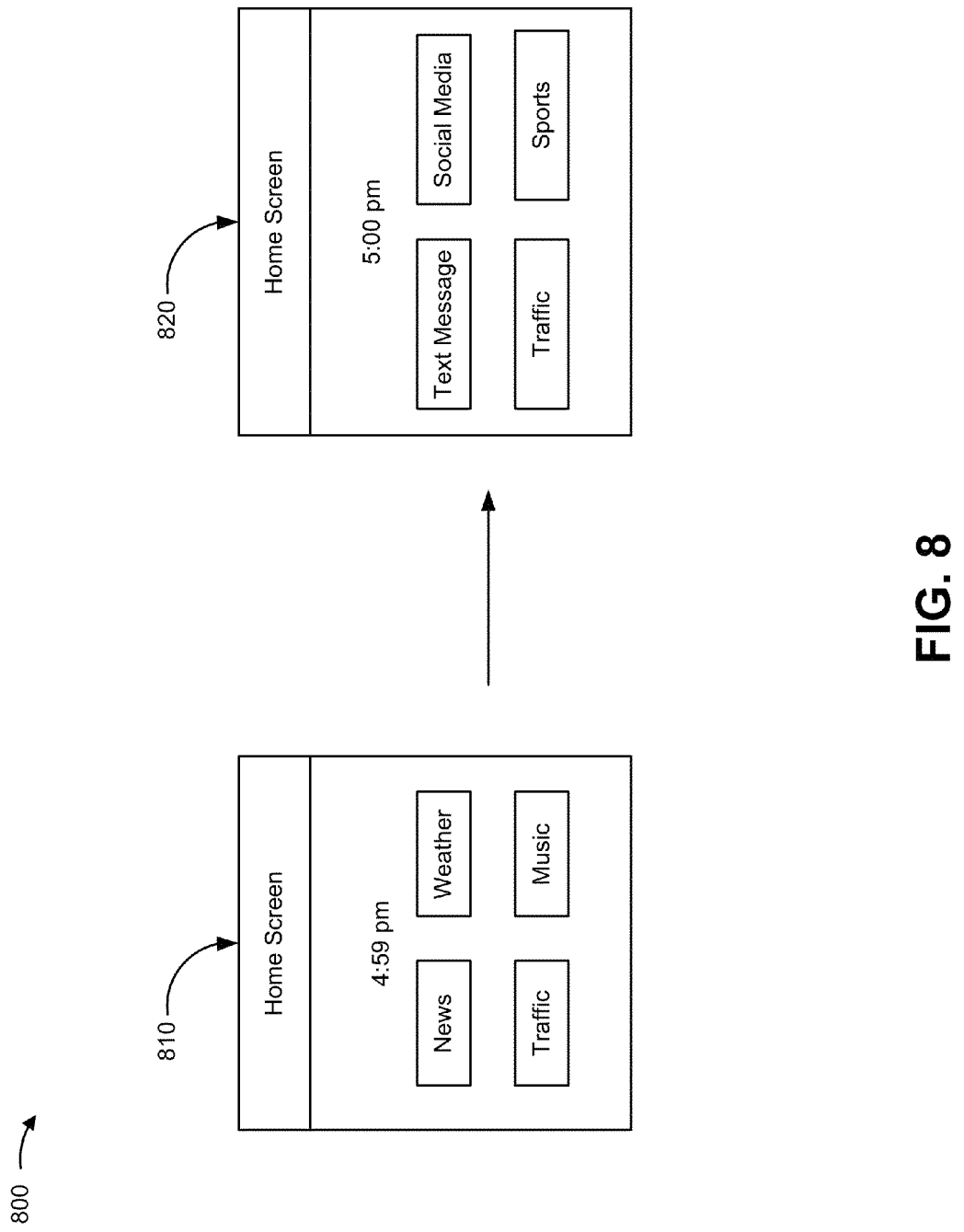

FIG. 8 is a diagram of an example implementation 800 relating to process 400 shown in FIG. 4. FIG. 8 shows user interfaces 810 and 820, which may be presented on a display of user device 210. In some implementations, user interfaces 810 and 820 may represent a home screen of user device 210.

As shown by user interface 810, a home screen of user device 210 may present application shortcuts when a set of conditions is met. For example, before 5:00 pm, the home screen may present shortcuts to a news application, a weather application, a traffic application, and a music application. When the set of conditions changes, user device 210 may change the application shortcuts presented on user interface 810, as shown by user interface 820. For example, on or after 5:00 pm, the home screen may present shortcuts to a text messaging application, a social media application, a traffic application, and a sports application.

In some implementations, user device 210 may add shortcuts to the home screen, may remove shortcuts from the home screen, may rearrange shortcuts on the home screen, etc. For example, user device 210 may change all of the shortcuts presented on the home screen. Alternatively, user device 210 may keep some of the shortcuts presented on the home screen and may replace other shortcuts presented on the home screen. User device 210 may determine shortcuts to remove and/or rearrange on the home screen based on specified conditions and/or current conditions, as discussed herein in connection with presenting shortcuts on the home screen. For example, user device 210 may determine shortcuts to remove from a home screen based on user input (e.g., specified conditions), user behavior, and/or aggregated information.

Figure 9:
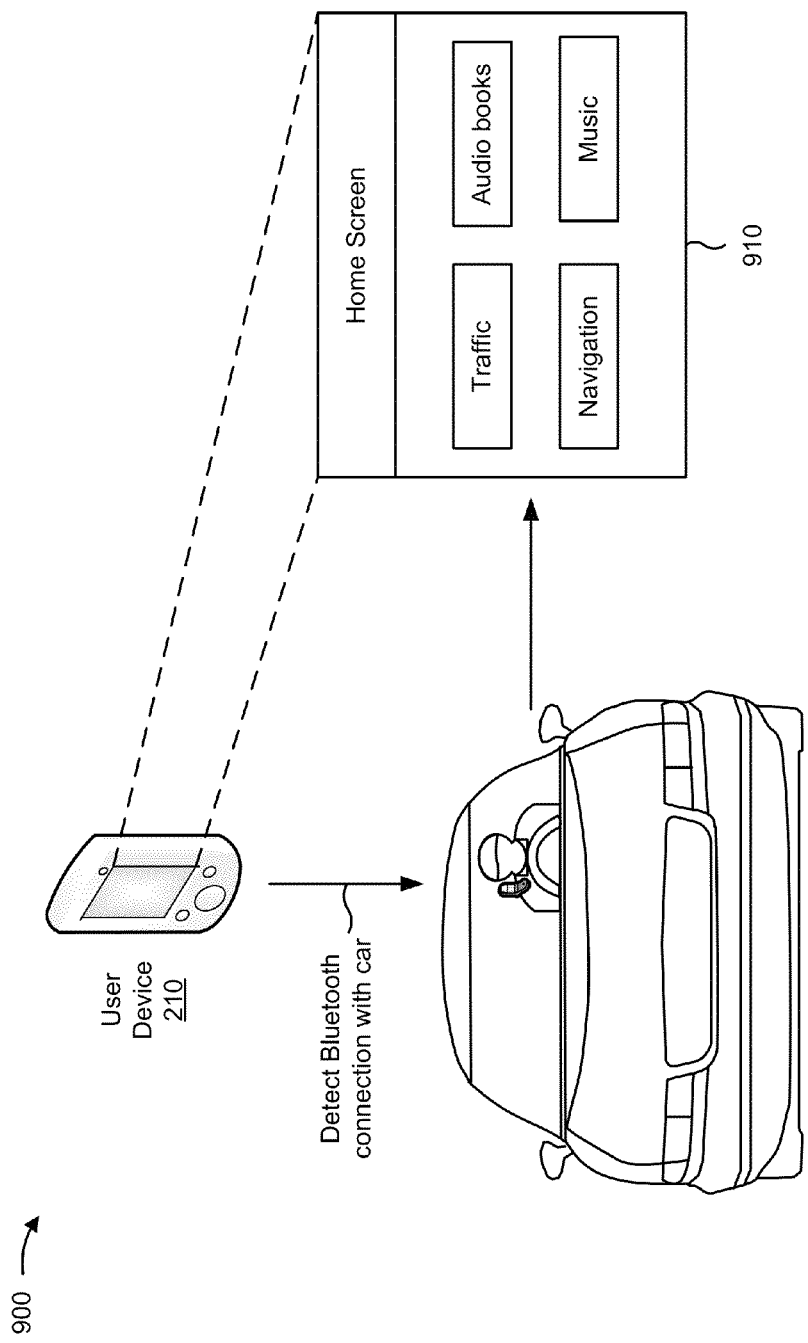

FIG. 9 is a diagram of an example implementation 900 relating to process 400 shown in FIG. 4. FIG. 9 shows a user interface 910, which may represent a home screen of user device 210.

As shown in FIG. 9, user device 210 may present specified application shortcuts on a home screen of user device 210 when user device 210 detects a Bluetooth connection with another device, such as a Bluetooth system in a user's car. When the user enters and/or starts the car, user device 210 may detect the Bluetooth connection, and may present a traffic application, an audio book application, a navigation application, and a music application, as shown on user interface 910. Additionally, or alternatively, user device 210 may present a hands-free application (e.g., an application that responds to voice commands). In some implementations, the applications may be categorized, such as in a "car" category, and user device 210 may display the shortcuts to application in the car category when user device 210 detects a Bluetooth connection between the user's car and user device 210.

In some implementations, user device 210 may detect that user device 210 is connected to another device (e.g., any other device) using a Bluetooth connection (and/or another type of network connection), and may present particular application shortcuts based on the detection. Additionally, or alternatively, user device 210 may detect that user device 210 is connected to a particular device (e.g., based on a name and/or security credentials associated with a Bluetooth network or another type of network), and may present particular application shortcuts based on the detection.

Implementations described herein may help users to easily locate applications by arranging application shortcuts on a home screen of a user device based on conditions detected by the user device.

While implementations have been described herein with respect to a home screen, the operations described herein may be performed in connection with another screen (e.g., a secondary screen, a user-customizable screen, etc.) other than a home screen.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms).

Certain user interfaces have been described herein. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more memories; and
one or more processors, connected to the one or more memories, to:
 present information that identifies a plurality of conditions associated with presenting an application shortcut for display on a home screen of the device;
 receive user input that identifies a set of specified conditions, of the plurality of conditions, associated with presenting the application shortcut for display on the home screen of the device,
  the set of specified conditions including at least one of:
   a time detected by the device,
   a day detected by the device,
   a date detected by the device,
   a speed detected by the device,
   a geographic location detected by the device,
   a temperature detected by the device,
   an altitude detected by the device, or
   a network connectivity detected by the device;
 receive aggregated in formation aggregated from a plurality of users,
  the aggregated information indicating a quantity or a percentage of users, of the plurality of users, that have launched an application, associated with the application shortcut, when the set of specified conditions is satisfied;
 determine that the quantity or the percentage satisfies a threshold;
 provide a recommendation that the application shortcut be presented on the home screen of the device based on determining that the quantity or the percentage satisfies the threshold;
 receive user input, based on providing the recommendation, that specifies that the application shortcut is to be presented on the home screen of the device when the set of specifies conditions is met;
 determine a set of current conditions associated with the device;
 determine that the set of current conditions satisfies the set of specified conditions; and
 present the application shortcut on the home screen of the device based on determining that the set of current conditions satisfies the set of specified conditions and based on receiving the user input that specifies that the application shortcut is to be presented on the home screen of the device when the set of specified conditions is met.

2. The device of claim 1, where the one or more processors are further to:
 present information that identifies a plurality of application shortcuts,
  the plurality of application shortcuts including the application shortcut; and
 where the one or more processors, when receiving the user input that specifies that the application shortcut is to be presented on the home screen of the device when the set of specified conditions is met, are to:
  receive user input that identifies the application shortcut from the plurality of application shortcuts.

3. The device of claim 1, where the one or more processors, when determining the set of current conditions associated with the device, are to:
 receive a request to present the home screen; and
 determine the set of current conditions based on receiving the request to present the home screen.

4. The device of claim 1, where the set of specified conditions, identified by the user input, includes at least one of:
 the speed detected by the device;
 the temperature detected by the device; or
 the altitude detected by the device.

5. The device of claim 1, where the one or more processors, when presenting the application shortcut on the home screen, are to:
 download an application, associated with the application shortcut, to the device; and
 present the application shortcut on the home screen based on downloading the application.

6. The device of claim 1, where the one or more processors, when providing the recommendation, are to:
 determine, based on information stored by the device, a quantity of times that an application, associated with the application shortcut, has been launched on the device when the set of specified conditions is satisfied;
 determine that the quantity of times satisfies another threshold; and
 provide the recommendation based on determining that the quantity of times satisfies the other threshold.

7. The device of claim 6, where the threshold and the other threshold are different thresholds.

8. A method comprising:
 presenting, on a user interface of a user device, information that identifies a plurality of conditions associated with presenting an application shortcut for display on a home screen of the user device;
 receiving, via the user interface of the user device, user input that identifies a set of specified conditions, of the plurality of conditions, associated with presenting the application shortcut for display on the home screen of the user device,
  the set of specified conditions including at least one of:
   a time detected by the user device,
   a day detected by the user device,
   a date detected by the user device,
   a speed detected by the user device,
   a geographic location detected by the user device,
   a temperature detected by the user device,
   an altitude detected by the user device, or
   a network connectivity detected by the user device;
 receiving, by the user device, aggregated information aggregated from a plurality of users,
  the aggregated information indicating a quantity or a percentage of users, of the plurality of users, that have launched an application, associated with the application shortcut, when the set of specified conditions is satisfied;
 determining, by the user device, that the quantity or the percentage satisfies a threshold;
 providing, by the user device and based on determining that the quantity or the percentage satisfies the threshold, a recommendation that the application shortcut be presented on the home screen of the user device;
receiving, by the device and based on providing the recommendation, user input that specifies that the application shortcut is to be presented on the home screen of the device when the set of specified conditions is met;
detecting, by the user device, a set of current conditions associated with the user device;
determining, by the user device, that the set of current conditions satisfies the set of specified conditions; and
presenting, by the user device, the application shortcut on the home screen of the user device based on determining that the set of current conditions satisfies the set of specified conditions and based on receiving the user input that specifies that the application shortcut is to be presented on the home screen of the device when the set of specified conditions is met.

9. The method of claim 8, further comprising:
identifying a plurality of application shortcuts, the plurality of application shortcuts including the application shortcut; and
where presenting the application shortcut on the home screen further comprises:
presenting the plurality of application shortcuts on the home screen.

10. The method of claim 8,
where providing the recommendation comprises:
providing a recommendation that the application be downloaded to the user device.

11. The method of claim 8, where the threshold is based on a quantity of times that the application has been launched with the set of specified conditions being satisfied.

12. The method of claim 8, where the threshold is based on a quantity of times that the application has been launched, with the set of specified conditions being satisfied, during a particular time period.

13. The method of claim 8, where providing the recommendation comprises:
determining a quantity of times that an application, associated with the application shortcut, is launched during a particular time period with the set of specified conditions being satisfied;
determining that the quantity of times satisfies another threshold; and
providing the recommendation based on determining that the quantity of times satisfies the other threshold.

14. The method of claim 13, where the threshold and the other threshold are different thresholds.

15. A non-transitory computer-readable medium storing instructions, the instructions comprising:
one or more instructions that, when executed by a processor of a user device, cause the processor to:
present information that identifies a plurality of conditions associated with presenting an application shortcut for display on a home screen of the user device;
receive user input that identifies a set of specified conditions, of the plurality of conditions, associated with presenting the application shortcut for display on the home screen of the user device,
the set specified conditions including at least one of:
a time detected by the user device,
a day detected by the user device,
a date detected by the user device,
a speed detected by the user device,
a geographic location detected by the user device,
a temperature detected by the user device,
an altitude detected by the user device, or
a network connectivity detected by the user device;
receive aggregated information aggregated from a plurality of users,
the aggregated information indicting a quantity or a percentage of users, of the plurality of users, that have launched an applications, associated with the application shortcut, when the set of specified conditions is satisfied;
determine that the quantity or the percentage satisfies a threshold;
provide, based on determining that the quantity or the percentage satisfies the threshold, a recommendation that the application shortcut presented on the home screen of the user device when the set of specified conditions is satisfied;
receive user input, based on providing the recommendation, that specifies that the application shortcut is to be presented on the home screen of the device when the set of specified conditions is met;
determine a set of current conditions associated with the user device;
determine that the set of current conditions satisfies the set of specified conditions; and
present the application shortcut on the home screen of the user device based on determining that the set of current conditions satisfies the set of specified conditions and based on receiving the user input that specifies that the application shortcut is to be presented on the home screen of the device when the set of specified conditions is met.

16. The non-transitory computer-readable medium of claim 15, where the one or more instructions, that cause the processor to provide the recommendation, cause the processor to:
determine, based on information stored by the user device, a quantity of times that an application, associated with the application shortcut, has been launched by the user device when the set of specified conditions is satisfied;
determine that the quantity of times satisfies a threshold; and
provide the recommendation based on determining that the quantity of times satisfies the threshold.

17. The non-transitory computer-readable medium of claim 15, where the one or more instructions, that cause the processor to present the application shortcut on the home screen, cause the processor to:
receive an indication that the application is to be downloaded;
download the application based on receiving the indication; and
present, based on downloading the application, the application shortcut on the home screen of the user device when the set of current conditions satisfies the set of specified conditions.

18. The non-transitory computer-readable medium of claim 15, where the one or more instructions, that cause the processor to receive the user input that identifies the set of specified conditions, further cause the processor to:
receive user input that identifies at least two of:
the time detected by the user device;
the day detected by the user device;
the date detected by the user device;
the speed detected by the user device;
the geographic location of the user device;
the temperature detected by the user device;
the altitude detected by the user device; or
the network connectivity detected by the user device.

19. The non-transitory computer-readable medium of claim 15, where the set of specified conditions includes multiple conditions.

20. The non-transitory computer-readable medium of claim 15, where the one or more instructions, that cause the processor to provide the recommendation, cause the processor to:
   provide information that identifies the quantity or the percentage.

\* \* \* \* \*